(12) United States Patent
Argueta-Diaz (10) Patent No.: US 7,215,474 B2
(45) Date of Patent: *May 8, 2007

(54) METHOD AND APPARATUS FOR COMBINING OPTICAL BEAMS

(75) Inventor: Victor Argueta-Diaz, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/256,578

(22) Filed: Oct. 21, 2005

(65) Prior Publication Data

US 2006/0114568 A1   Jun. 1, 2006

Related U.S. Application Data

(63) Continuation of application No. 10/727,009, filed on Dec. 2, 2003, now Pat. No. 6,958,861.

(60) Provisional application No. 60/430,214, filed on Dec. 2, 2002, provisional application No. 60/430,213, filed on Dec. 2, 2002, provisional application No. 60/430,207, filed on Dec. 2, 2002.

(51) Int. Cl.
  *G02B 27/10* (2006.01)
  *G02B 27/12* (2006.01)
  *G02B 5/04* (2006.01)
  *G02B 5/08* (2006.01)
  *G02B 4/10* (2006.01)

(52) U.S. Cl. ............ 359/618; 359/619; 359/625; 359/639; 359/640; 359/834; 359/858; 359/861; 348/41; 385/47; 349/140

(58) Field of Classification Search ............ 359/1, 359/15, 22, 25, 28, 618, 619, 625, 639, 640, 359/834, 858, 861, 633, 859, 729, 731, 495, 359/496; 385/31, 36, 47; 348/41, 51, 739; 349/137, 140

See application file for complete search history.

(56) References Cited

U.S. PATENT DOCUMENTS 3,428,391 A   2/1969   Newcomer (Continued)

OTHER PUBLICATIONS

J. White, "Long Optical Paths of Large Aperture," Journal of the Optical Society of America, 1942, pp. 285-288, vol. 32.

(Continued)

*Primary Examiner*—Loha Ben
(74) *Attorney, Agent, or Firm*—Calfee, Halter & Griswold LLP (57) ABSTRACT

According to one aspect of the present invention, an apparatus for optically combining light beams is disclosed. The apparatus includes a set of prism shaped doorways configured to receive output beams from at least one optical device. Each of the plurality of doorways has a common refractive index. The apparatus also includes a set of spherical mirrors disposed substantially parallel to the plurality of doorways. Each mirror is associated with one of the plurality of doorways. The apparatus further includes a boundary layer disposed between the set of doorways and the set of mirrors. The boundary layer has a refractive index greater than the common refractive index of the plurality of doorways. The common refractive index of the set of doorways and the refractive index of the boundary layer are configured to change the angle of each of the received output beams to combine the set of received output beams into a single output beam.

22 Claims, 8 Drawing Sheets

U.S. PATENT DOCUMENTS

| | | | |
|---|---|---|---|
| 3,463,571 A * | 8/1969 | Boehm et al. | 359/495 |
| 3,755,676 A | 8/1973 | Kinsel | |
| 3,892,468 A | 7/1975 | Duguay | |
| 4,225,938 A | 9/1980 | Turpin | |
| 4,344,671 A | 8/1982 | Lang | |
| 4,474,434 A | 10/1984 | Carlsen et al. | |
| 4,474,435 A | 10/1984 | Carlsen et al. | |
| 4,546,249 A | 10/1985 | Whitehouse et al. | |
| 4,929,956 A | 5/1990 | Lee et al. | |
| 5,018,816 A | 5/1991 | Murray et al. | |
| 5,018,835 A * | 5/1991 | Dorschner | 349/140 |
| 5,117,239 A | 5/1992 | Riza | |
| 5,276,758 A | 1/1994 | Hughes | |
| 5,319,477 A | 6/1994 | DeJule | |
| 5,418,880 A * | 5/1995 | Lewis et al. | 385/123 |
| 5,463,497 A | 10/1995 | Muraki et al. | |
| 5,465,175 A | 11/1995 | Woodgate et al. | |
| 5,512,907 A | 4/1996 | Riza | |
| 5,592,333 A * | 1/1997 | Lewis | 359/628 |
| 5,623,360 A | 4/1997 | Gesell et al. | |
| 5,724,163 A | 3/1998 | David | |
| 5,726,752 A | 3/1998 | Uno et al. | |
| 5,767,956 A | 6/1998 | Yoshida | |
| 5,852,693 A * | 12/1998 | Jeong | 385/47 |
| 5,859,697 A | 1/1999 | Kaufeld et al. | |
| 5,936,759 A | 8/1999 | Buttner | |
| 5,973,727 A * | 10/1999 | McGrew et al. | 348/41 |
| 6,014,244 A | 1/2000 | Chang | |
| 6,040,880 A | 3/2000 | Tsuboi | |
| 6,064,506 A | 5/2000 | Koops | |
| 6,181,367 B1 * | 1/2001 | McGrew et al. | 348/41 |
| 6,188,817 B1 | 2/2001 | Goodfellow | |
| 6,236,506 B1 | 5/2001 | Cao | |
| 6,266,176 B1 | 7/2001 | Anderson et al. | |
| 6,323,981 B1 | 11/2001 | Jensen | |
| 6,388,815 B1 | 5/2002 | Collins et al. | |
| 6,480,323 B1 | 11/2002 | Messner et al. | |
| 6,522,404 B2 | 2/2003 | Mikes et al. | |
| 6,525,889 B1 | 2/2003 | Collins, Jr. et al. | |
| 6,535,340 B1 | 3/2003 | Saruwatari | |
| 6,637,899 B2 * | 10/2003 | Sunaga et al. | 359/858 |
| 6,647,164 B1 | 11/2003 | Weaver et al. | |
| 6,674,939 B1 | 1/2004 | Anderson et al. | |
| 6,711,316 B2 | 3/2004 | Ducellier | |
| 6,724,535 B1 | 4/2004 | Clabburn | |
| 6,724,951 B1 | 4/2004 | Anderson et al. | |
| 6,734,955 B2 | 5/2004 | Wight et al. | |
| 6,760,140 B1 | 7/2004 | Argueta-Diaz et al. | |
| 6,816,307 B1 | 11/2004 | Sun | |
| 6,934,069 B2 | 8/2005 | Moon et al. | |
| 6,952,306 B1 | 10/2005 | Anderson | |
| 6,958,861 B1 | 10/2005 | Argueta-Diaz | |
| 2002/0030814 A1 | 3/2002 | Mikes et al. | |
| 2003/0202731 A1 | 10/2003 | Ionov et al. | |
| 2004/0190823 A1 | 9/2004 | Leuthold et al. | |
| 2005/0007668 A1 | 1/2005 | Serati et al. | |

OTHER PUBLICATIONS

J.U. White, "Very Long Optical Paths in Air," Journal of the Optical Society of America, 1976, pp. 411-416, vol. 66.

V. Argueta, B.L. Anderson, S.A. Collins, Jr., "Binary Optical Interconnection: Patent Addendum."

B.E.A. Saleh and M.C. Teich, "Fundamentals of Photonics," 1991, New York: John Wiley and Sons.

R.T. Cheng, S. Tang, M.M. Li, D. Gerald, S. Natarajan, "1 to12 Surface-Normal Three-Dimensional Optical Interconnects," Appl. Phys. Lett. 63, 1983, pp. 1883-1885, vol. 63.

M.M Li, R.T. Cheng, S. Tang, "Angular Limitations of Polymer-Based Waveguides Holograms for 1-to-many V-shaped Surface-Normal Optical Interconnects," Appl. Phys. Lett. 65.

J. Liu, C Zhao, R. Lee, R.T. Chen, "Cascaded energy-optimized linear volume hologram array for 1-to-many surface-normal even fan-outs," Optics and Laser Technologies, 1997.

Anderson, et al., Increasing Efficiency of Optical Beam Steerers, Draft Technical Report #3 for Harris Corporation, The Ohio State University, May 30, 2003, pp. 1-11.

Anderson et al., Binary-Counting True Time Delay Generator Using a White Cell Design and Deformable Mirror Devices, LEOS, Orlando, FL, Dec. 1998, 2 pgs.

Anderson et al., Design Advances in Free-Space Optical True-Time Delay Device, PSAA-8, Monterey, CA, Jan. 1998, 3 pgs.

Anderson et al., Highly Parallel Optical Device to Produce True Time Delays for Phased Array Antennas, Allerton, Sep. 1998, 14 pgs.

Anderson et al., Optically Produced True-Time Delays for Phased Antenna Arrays, Applied Optics, vol. 36, No. 32, Nov. 20, 1997, pp. 8493-8503.

Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.

Anderson, et al. Optical Interconnection Device Based on the White Cell, presentation at Notre Dame University Nov. 6, 2002, 46 pgs.

Anderson, Optical Interconnections, Optical True-Time Delays, and More . . , presentation at University of Colorado Jan. 28, 2003, 61 pgs.

Anderson, et al., Polynomial-based optical true-time delay devices with microelectromechanical mirror arrays, Applied Optics, vol. 41, No. 26, Sep. 10, 2002, pp. 5449-5461.

Argueta-Diaz, et al. Reconfigurable Photonic Switch Based on a Binary System Using the White Cell and Micromirror Arrays, IEEE Journal of Selected Topics in Quantum Electronis, vol.9, No. 2, Mar./Apr. 2003, pp. 594-602.

Cohen et al., Optically Controlled Serially Fed Phased Array Sensor, IEEE Photonics Technology Letters, vol. 8, No. 12, Dec. 1996, pp. 1683-1685.

Collins et al., Numerical Optical Data Processing, Proceeding of the 1978 International Optical Computing Conference , London, England, Sep. 1978, pp. 194-197.

Collins et al., Optics for Numerical Calculations, Proceedings of ICO-11 Conference, Madrid, Spain, 1978, pp. 311-314.

Collins, Jr. et al., Optical True Time Delay for Phased Array Antennas Based on the White Cell , GOMAC, Monterey, CA, Mar. 1999, 4pgs.

Collins, Numerical Optical Data Processor, SPIE, vol. 128, Effective Utilization of Optics in Radar Systems, 1977, pp. 313-319.

Ewing et al., Advancements in LCoS Optical Phased Array Technology, SPIE Great Lakes Regional Symposium, Cleveland, OH, Jun. 7, 2004, pp. 1-23.

Fairly et al., The Microphotonics Revolution, Mit's Magazine of Innovation, Technology Review, Jul./Aug. 2000, pp. 38-44.

Freitag et al., A Coherent Optically Controlled Phased Array Antenna System, IEEE Microwave and Guided Wave Letters, vol. 3, No. 9, Sep. 1993, pp. 293-295.

Goutzoulis et al., Hybrid Electronic Fiber Optic Wavelength-Multiplexed System for True Time-Delay Steering of Phased Array Antennas, Optical Engineering, vol. 31, No. 11, Nov. 1992 pp. 2312-2322.

Higgins et al., Design and demonstration of a switching engine for a binary true-time-delay device that uses a White cell, Applied Optics vol. 42, No. 23, Aug. 10, 2003, pp. 4747-4757.

Rader, et al., Demonstration of Linear Optical True-time Delay Device by Use of a Microelectromechanical Mirror Array, Applied Optics, vol. 42, No. 8, Mar. 10, 2003, pp. 1409-1416.

Yen et al., Operation of a Numerical Optical Data Processor, 1980, SPIE vol. 232, International Optical Computing Conference, 1980, pp. 160-167.

* cited by examiner

METHOD AND APPARATUS FOR COMBINING OPTICAL BEAMS

This application is a continuation of U.S. patent application Ser. No. 10/727,009, filed Dec. 2, 2003, now U.S. Pat. No. 6,958,861, which is fully incorporated herein by reference, and which claims priority to U.S. Provisional Pat. App. Ser. Nos. 60/430,213, 60/430,207, and 60/430,214, all filed Dec. 2, 2002, which are each fully incorporated herein by reference.

CROSS-REFERENCE TO RELATED APPLICATION

The present application is related to U.S. patent application Ser. No. 10/726,770, filed Dec. 2, 2003, now U.S. Pat. No. 6,952,306, which is fully incorporated herein by reference, and which claims priority to U.S. Provisional Pat. App. Ser. No. 60/430,207, filed Dec. 2, 2002, which is fully incorporated herein by reference. The present application is also related to U.S. patent application Ser. No. 10/726,771, filed Dec. 2, 2003, which is fully incorporated herein by reference, and which claims priority to U.S. Provisional Pat. App. Ser. No. 60/430,214, filed Dec. 2, 2002, which is fully incorporated herein by reference.

TECHNICAL FIELD

The devices, methods and systems described herein relate generally to optical interconnection devices and more particularly to a device for optically combining light beams.

BACKGROUND

Some optical devices, such as certain optical correlators, output a set of light beams which land in slightly different locations and come from different angles. In order to connect such devices with other optical devices, it may be beneficial to combine the set of multiple output beams into a single output beam.

SUMMARY OF THE INVENTION

The following presents a simplified summary of apparatus, systems and methods associated with an optical correlator to facilitate providing a basic understanding of these items. This summary is not an extensive overview and is not intended to identify key or critical elements of the methods, systems, apparatus or to delineate the scope of these items. This summary provides a conceptual introduction in a simplified form as a prelude to the more detailed description that is presented later.

According to a first aspect of the present invention, an apparatus for optically combining light beams is disclosed. The apparatus includes a plurality of prism shaped doorways configured to receive output beams from at least one optical device. Each of the plurality of doorways has a common refractive index. The apparatus also includes a plurality of spherical mirrors disposed substantially parallel to the plurality of doorways. Each mirror is associated with one of the plurality of doorways. The apparatus further includes a boundary layer disposed between the plurality of doorways and the plurality of mirrors. The boundary layer has a refractive index greater than the common refractive index of the plurality of doorways. The common refractive index of the plurality of doorways and the refractive index of the boundary layer are configured to change the angle of each of the plurality of output beams to combine the plurality of output beams into a single output beam.

Certain illustrative example apparatus, systems and methods are described herein in connection with the following description and the annexed drawings. These examples are indicative, however, of but a few of the various ways in which the principles of the apparatus, systems and methods may be employed and thus are intended to be inclusive of equivalents. Other advantages and novel features may become apparent from the following detailed description when considered in conjunction with the drawings.

BRIEF DESCRIPTION OF THE DRAWINGS

Comprehension of the invention is facilitated by reading the following detailed description, in conjunction with the associated drawings, in which.

DETAILED DESCRIPTION

The interconnection device of the present invention is based on the optical White cell. The original White cell is a set of three spherical mirrors with identical radii of curvature. The present invention employs a microelectromechanical systems (MEMS) device and a system of spherical mirrors that refocus the beam continuously. According to the present invention, instead of having one of the original White cell's spherical mirrors, the present interconnection device employs the MEMS array of micromirrors, each of which can be independently tilted to different angles. Multiple beams can bounce in the White cell simultaneously, and each is focused to a spot on a new micromirror on each pass. Thus, there is an opportunity to switch a beam toward a new destination on each bounce.

The number of possible attainable outputs depends, in part, on the number of bounces that the beams make in the White Cell, so by controlling the number of bounces one can increase the number of outputs.

The present invention is a highly scaleable all-optical 3D cross-connect switch for a large number of ports (N inputs×N outputs), that avoids both the divergence issue and the need for high precision on the angle control of the MEMS micromirrors.

Because several beams bounce inside the White cell, each one of them is controlled individually in such a way that the destination of each beam may be controlled. That is, each beam can be directed to any of multiple output regions. There is, however, a problem: on the final stage each beam will have a distinct incidence angle depending on which output region a particular beam is directed, which complicates the coupling into a fiber core or detector. The spot may also land in various locations within the output region.

The present invention addresses this problem and may be used separately or integrated in the output stage of an optical device, such as a switch. The present invention performs two functions: it causes all the possible beam locations to be superimposed, and it corrects for the variation in the angle of incidence. Thus each beam is modified such that it can be coupled properly into a fiber.

The present invention provides optical interconnection by employing certain principles of White cells, as described below. Further, the present invention addresses coupling issues related to coupling an optical device, such as a photonic switch, for example, to a fiber core or detector.

White Cell

Figure 1:
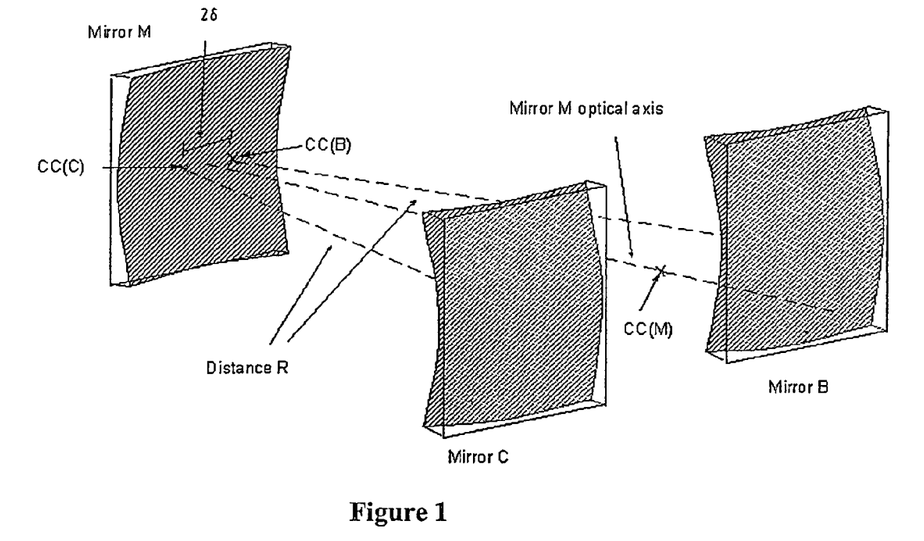
FIG. 1 is a perspective view of an exemplary Optical White Cell configuration.

The typical White cell consists of three spherical mirrors, as shown in FIG. 1. One mirror faces the other two, and is separated from them by a distance equal to their radii of curvature R, which is the same for all three mirrors.

Figure 2A:
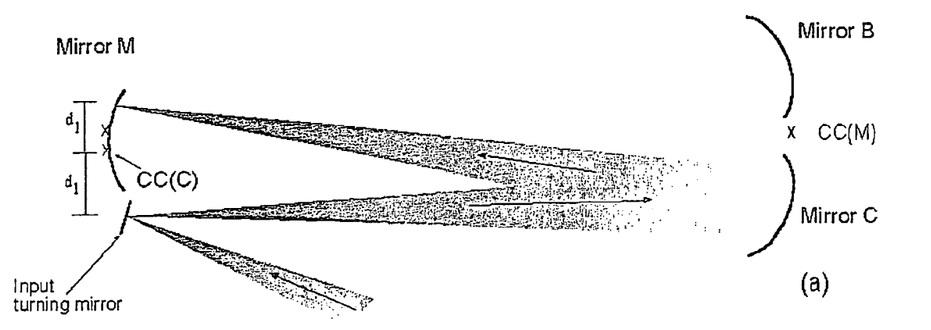
FIG. 2a is a first top view of a white cell illustrating light reflection using input turning mirror, mirror C and mirror M.

The center of curvature of mirror M (CC(M)) lies on the optical axis. Because Mirrors B and C are mounted across from mirror M and separated from it by a distance equal to the radius of curvature R, either mirror B or C images the surface of mirror M onto itself, whereas mirror M images B and C onto each other. The centers of curvature of mirror B and C (CC(B) and CC(C)) are located on mirror M, at a distance δ left and right of the optical axis, respectively. Hence the centers of curvatures are separated by 2δ. The locations of the centers of curvature are key to the operation of the binary optical interconnection The path of a single beam through the White Cell is illustrated in FIG. 2. FIG. 2a shows how light enters the White Cell through an input turning mirror located adjacent to mirror M. Light is focused to a spot on the input turning mirror. Light diverging from this input spot will propagate toward mirror C and then be refocused by mirror C back onto mirror M. The input spot is located at a distance $d_1$ below the mirror C's center of curvature, and the first image of the spot will therefore be located on mirror M, at an equal distance $d_1$ above of C's center of curvature.

Figure 2B:
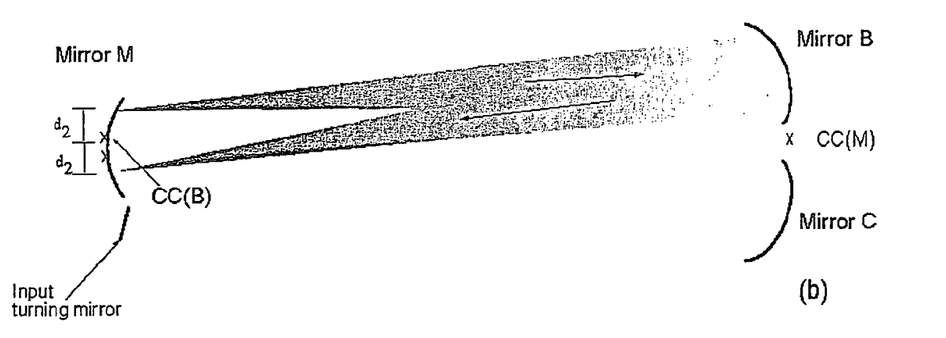
FIG. 2b is a second top view of a white cell illustrating light reflection using mirror B and mirror M.

FIG. 2b shows how light bounces from this new position off mirror M towards mirror B. Light diverging from the new position on mirror M will propagate towards mirror B and then be refocused by mirror B onto mirror M. The object spot is located at a distance $d_2$ above the mirror B's center of curvature, and the second image will appear on mirror M at an equal distance $d_2$ below B's center of curvature.

Figure 2C:
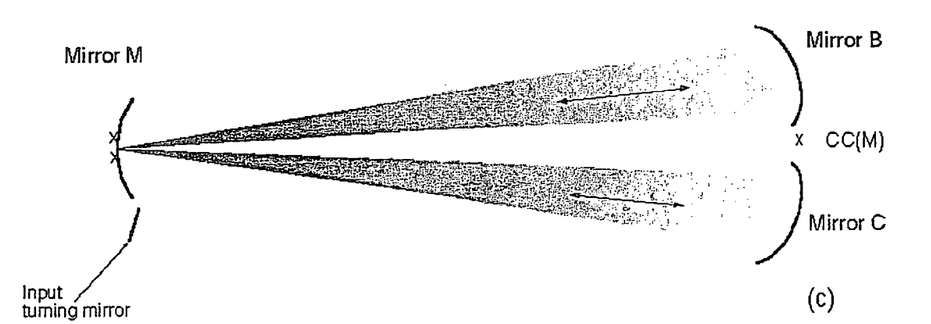
FIG. 2c is a third top view of a white cell illustrating light reflection using mirror B, mirror C and mirror M.

An important feature of the White cell is shown in FIG. 2c, where light from C is imaged onto B. As long as these two mirrors are the same size, light can be imaged back and forth between them many times without additional diffraction losses from the edges of the mirrors. Therefore the losses in the system are cause only by the mirrors' reflectivities.

Figure 3A:
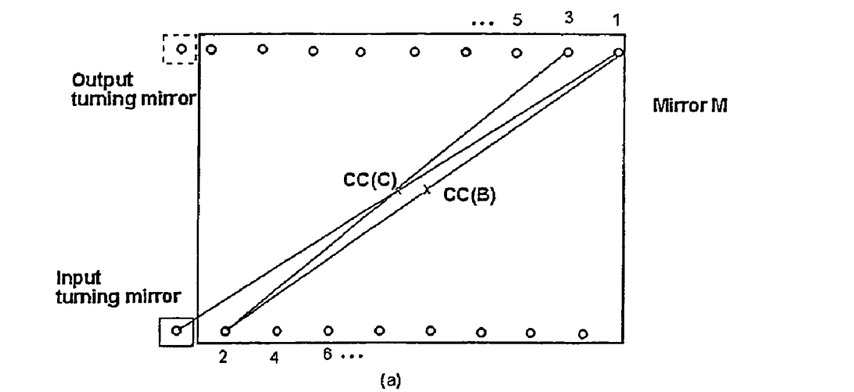
FIG. 3a is a diagram illustrating a white cell pattern bounce of a single input on mirror M.

This multiple-reflection configuration will result in a spot pattern on the surface of mirror M. The spot pattern is very predictable depending as it does only on the locations of the centers of curvature of mirror B and C. FIG. 3a shows the sequence of spots on mirror M for a particular input spot. FIG. 3a depicts the front of Mirror M. The locations of the centers of curvature of each mirror are indicated. An output turning mirror has been added to extract the beam from the White cell after all the bounces have been completed. The spots in the Figure are numbered in the order in which the light "bounces" in the White Cell before finally imaging onto the output turning mirror. The odd-numbered spots progress across the top to the left and the even-numbered spots progress across the bottom to the right.

The spacing between the spots for a given input beam is directly related to the distance 2δ between the centers of curvature of mirrors B and C. The total number of spots on mirror M is therefore dependent on δ and the overall size of mirror M. It should be noted that the spot locations depend entirely on the alignment of the two Mirrors B and C, and not on Mirror M. This will become important when Mirror M is replaced with a MEMS mirror and the spots are made to land on tilting micromirrors.

Figure 3B:
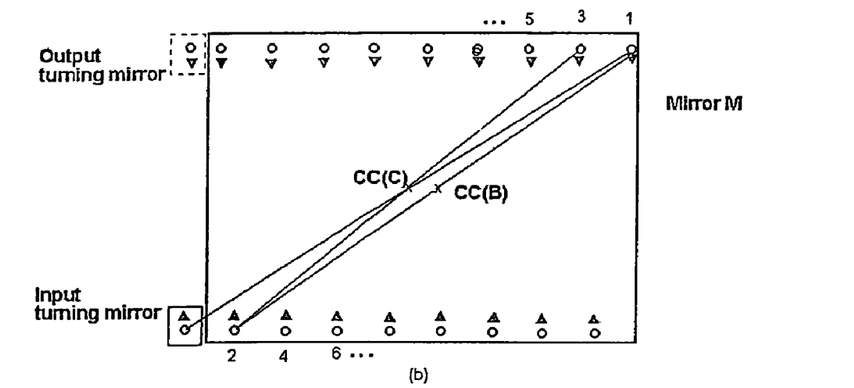
FIG. 3b is a diagram illustrating a white cell pattern bounce of two inputs on mirror M.
Figure 3C:
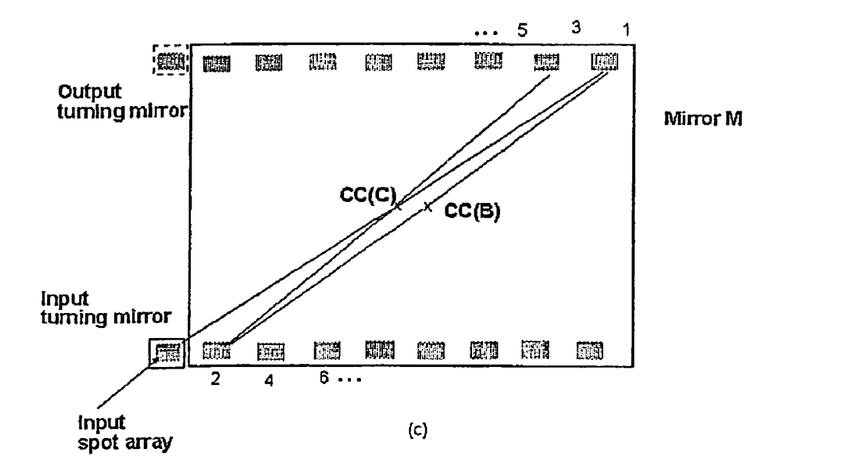
FIG. 3c is a diagram illustrating a white cell pattern bounce of multiple inputs on mirror M.

A second beam may be introduced into the White cell, as shown in FIG. 3b. Each input spot results in a different spot pattern. In fact, as shown in FIG. 3c, a large array of spots may be introduced, each representing a different input signal. The spot patterns for each input beam are unique. None of the bounces from any of the beams will strike any spot from another beam. According to the present invention, a MEMS may be used in place of Mirror M, and each spot from each beam will strike a different micromirror. Thus each beam in the array of input beams can be independently controlled on every bounce.

With such an arrangement, optical switching may be performed by allowing each input beam to be switched between various White cell paths that alter the spot patterns and thus the exit location of each beam. It is advantageous to allow for a very large number of potential outputs for each of the input beams, but with the smallest possible number of bounces. Reducing the number of bounces reduces the loss, which will accumulate on every bounce.

In accordance with the present invention, there are several configurations which enhance the number of possible outputs with the least number of bounces. The solutions can be divided in two categories: polynomial and exponential cells.

In the "polynomial cells," the number of possible outputs N is proportional to the number of bounces m raised to some power, for example in a quadratic cell $N \propto m^2$. In the "exponential cells," the number of possible outputs is proportional to a base number raised to the number of bounces ($N \propto 2^m$ for the binary case). The exponential approach has the advantage of providing far more connectivity for a given number of bounces (and thus loss), but the disadvantage of not having the built-in redundancy of the polynomial devices. For the sake of explanation, a binary system will be disclosed to describe one embodiment of the present invention.

Binary Cell

Optical switching will now be discussed, which accomplished by allowing each of a large number of input beams to be switched between two different White cells. A first White cell produces the two rows of spots for each input beam, and a second White cell incorporates a spot displacement devices that will continue the spot patterns but displace them by some number of rows, thus changing the exit location of each beam. It is advantageous to allow for a very large number of potential outputs for each of the input beams, but with the smallest possible number of bounces. Reducing the number of bounces reduces the loss, which will accumulate on every bounce. To this end commonly assigned U.S. Pat. Nos. 6,266,176 and 6,388,815, each of which is incorporated by reference herein, describe a "binary cell," in which the number of output is proportional to $2^{m/4}$, where m is the number of bounces in the White cell. According to the present invention, two White cells are combined to produce the interconnection device.

In the White cell disclosed by the '176 and '815 patents, the location at which a spot leaves the cell is determined by where the beam went in, and where the centers of curvature of Mirrors B and C were. The present invention recognizes that the White cell may be modified to control the output location. To do this, Mirror M is replaced with a MEMS tilting micro-mirror array to select between two different paths on each bounce. An additional White cell is added in the newly available path. Both White cells produce a similar spot pattern, but in the second White cell, spots are shifted such that they return in a different row than if they are sent to the first White cell.

Figure 4:
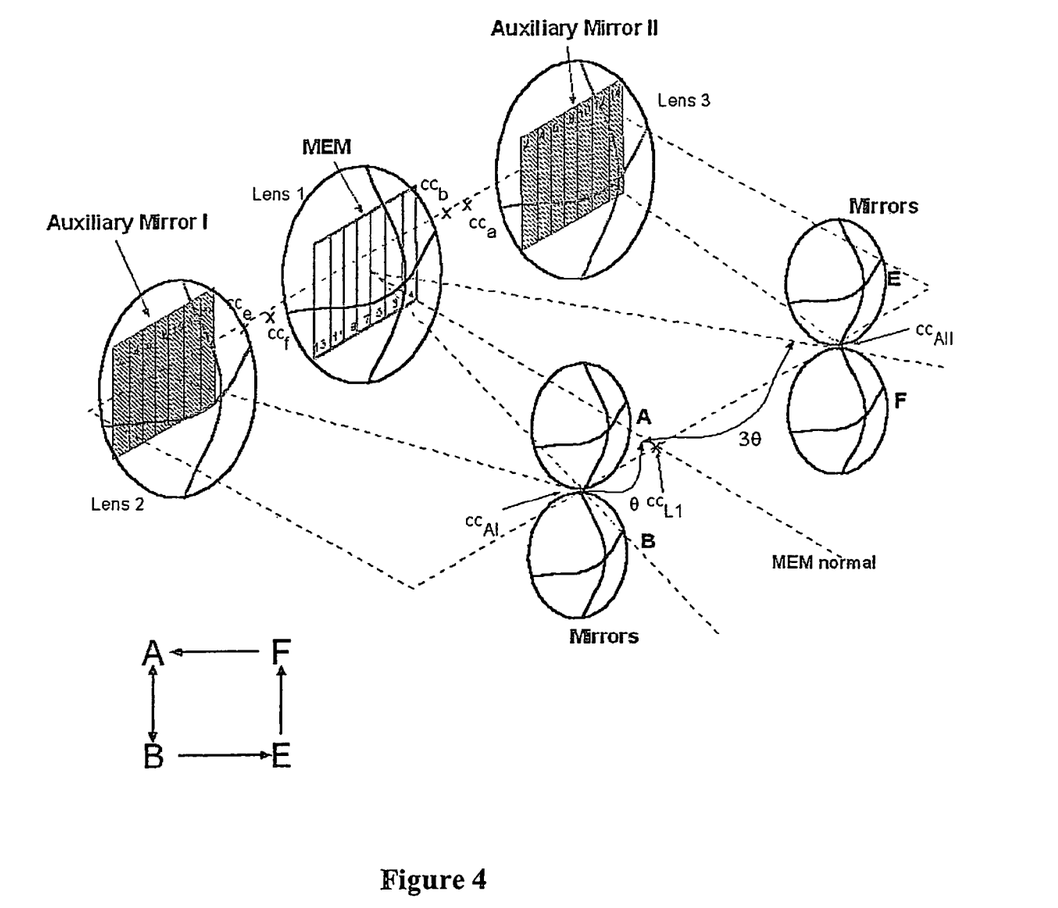
FIG. 4 is a diagram of an exemplary binary switch configuration.

FIG. 4 shows the design for the binary White cell device. Mirror M has been replaced with a MEMS micromirror array and a lens. The lens/MEMS combination performs the imaging function of the original spherical mirror M. On either side of the MEMS are placed two flat mirrors (Auxiliary Mirrors I and II). Each of the auxiliary mirrors also has a field lens to simulate a spherical mirror. These could be combined into a single, larger lens as well. There are, in addition, four spherical mirrors on the right instead of two. Instead of having the centers of curvature of the spherical mirrors on the MEMS, the centers of curvature are placed outside the MEMS. The possible micromirror tip angles are $\pm\theta$. Mirrors A and B are placed one above the other, along an axis at $-\theta$. Mirrors E and F are also placed one above the other along an axis at $+3\theta$. The center of curvature of the lens associated with the MEMS is placed on the MEMS' normal; the center of curvature of the Auxiliary mirror I and its lens is placed between mirrors A and B, and similarly, the center of curvature of Auxiliary Mirror II and its lens is placed C between mirrors E and F.

Assume an input beam going from the MEMS plane is sent to mirror A, for example after bounce 1. Light coming from this spot is imaged to a new spot Auxiliary Mirror I (labeled "2"). From there the light is reflected to mirror B, which sends the light back to the MEMS at a new location, bounce number 3. If the micromirror at that spot is set to $-\theta$, then the light is sent back to mirror A again. So, Mirrors A and B form a White cell with the MEMS, Auxiliary Mirror I, and the Lens 1.

If a pixel at bounce 3 is then turned to $+\theta$, then light coming from mirror B to this micromirror will be reflected from the MEMS at an angle of $+3\theta$ with respect to the normal to the MEMS plane. Of course, there are two more mirrors along that axis, E and F. So, light coming from B will go to E. In this configuration, light always moves from an upper mirror to a lower mirror. When light goes to mirror E the light is sent to auxiliary mirror II, where it forms a spot ("4"). From there the light is sent to the lower mirror F, and then back to the MEMS plane. Therefore, Mirror E and F form another White Cell. If the next micromirror in the MEMS is tilted to $-\theta$, the beam from F is sent again to the AB White cell (specifically to mirror A). If the micromirror at this point had been tilted to $+\theta$, the light coming from F would have been reflected at $+4\theta$, a direction that is not being used in this design, and the beam is lost.

Thus, according to the connectivity diagram shown in the lower left-hand corner in FIG. 4, light can bounce continuously (and exclusively) between the MEMS and Auxiliary Mirror I via Mirror A and B, a situation that doesn't occur while bouncing through E and F. Light going to auxiliary mirror II gets there via Mirror E and returns to the MEMS via mirror F. From here light must go to auxiliary mirror I. Therefore, light returning from auxiliary mirror II bounces four times to go back to auxiliary mirror II.

An input beam can be sent to Mirror A from the MEMS plane every even-numbered bounce, and to Mirror E every fourth bounce (i.e. 4, 8, 12. . . ). The odd-numbered bounces always appear on the MEMS, and the even-number spots can appear either on Auxiliary Mirror I or Auxiliary Mirror II. The light can be sent to auxiliary mirror II on any particular even-numbered bounce, but if the light is sent there, four bounces are required before it can be sent there again.

In accordance with the present invention, Auxiliary Mirror II is replaced by a device that shifts a spot down by some number of rows. The spots will be shifted by this Spot Displacement Device (SDD). Auxiliary Mirror II is divided into columns, one column to every four bounces, and the number of pixels by which a beam is shifted will be different for each column. That is, each column will shift a beam by a distance equal to twice that of the shift produced by the previous column. The first column will produce a shift of $\Delta$, the second column a shift of $2\Delta$, the third column a shift of $4\Delta$ and so on, then producing a binary system.

By shifting the spots, one can control at which row any given beam reaches the output turning mirror, and one can associate each row with a different output. The number of possible outputs is determined by the total number of possible shifts for a given number of bounces. In the design of FIG. 4, a shift is made every time the light goes to the SDD, but this can only happen every four bounces. Thus the number of outputs N is given by:

$$N_{binary} = 2^{m/4} \qquad (1)$$

where m is the number of bounces.

Figure 5:
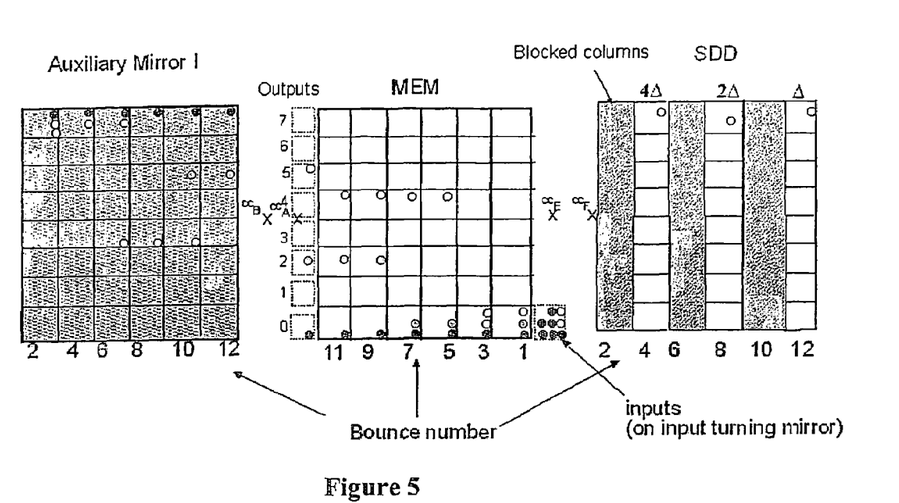
FIG. 5 is a diagram of a spot pattern for multiple inputs on the binary white cell.

A 12-bounce system is presented in FIG. 5, to illustrate the operation. As shown, eight different beams are incident on the input turning mirror. The rest of the spot patterns for three of those beams are indicated. The MEMS, auxiliary Mirror I, and the SDD are divided into a grid of eight rows (for either possible output locations) and seven columns (for each bounce on the MEMS). Each region on this grid the MEMS is a group of eight micromirrors, so that each beam lands on a different micromirror on each bounce and can be directed either to the SDD or to Auxiliary Mirror I. The number of columns on the SDD (m/4), will thus determine the number of possible outputs, the columns that are not used are then 'blocked' or unused. Every four bounces allows for a shift, so 12 bounces will produce $2^3 = 8$ different outputs for each input.

The figure shows three different input beams (white, gray and black) and eight possible outputs (numbered 0 to 7 on the figure). Initially all three input beams start on row zero. According to the connectivity diagram of FIG. 4, an input can only go to the EF White Cell every fourth bounce (those would be the $4^{th}$, $8^{th}$ and $12^{th}$ bounces). So, assume that one wanted to send the "white" beam to the fifth output. To accomplish this, the "white" beam is sent to the SDD on the fourth and twelfth bounces, which correspond to displacements of 4Δ and Δ respectively. The "white" beam starts bouncing in the AB White Cell (i.e. the micromirrors on the MEM are tilted to −θ position), until it's sent to the SDD on the fourth bounce (i.e. the micromirror is tilted to +θ). Then the "white" beam goes through the SDD, which for that particular column has a value of 4Δ, it will send the output back to the MEM on the fourth row instead of the zeroth row. We then keep bouncing the "white" beam in the AB White cell, until the $12^{th}$ bounce, when we again send the input to the SDD. Now, the beam will land in the column with the value of Δ, where it goes through the SDD and is shifted by an additional distance Δ. In a similar way, we can send the "gray" beam to the second output and the "black" beam to the zeroth output.

Combining the Beams at the Outputs

It should be noted that any input directed to a particular output will land in a different place within that output region. For example, in FIG. 5, the white beam was sent to output four and appeared in the upper right hand corner. Had the black beam been sent to output four, its spot would appear in the lower right hand corner. Thus, once a given input has reached the correct output region, the spots must all be made to land in the same spot, for example on a detector or a fiber core. This is non-trivial in the White cell because in addition to arriving at different locations, the beams may arrive from different angles, a factor that will seriously affect coupling into a fiber.

There are actually two angles of concern here. The first has to do with which White cell a beam is arriving from when it reaches the output region, and this is the "lateral" angle. The other is a vertical angle arising from the particular output location within that region that the spot forms.

Figure 6A:
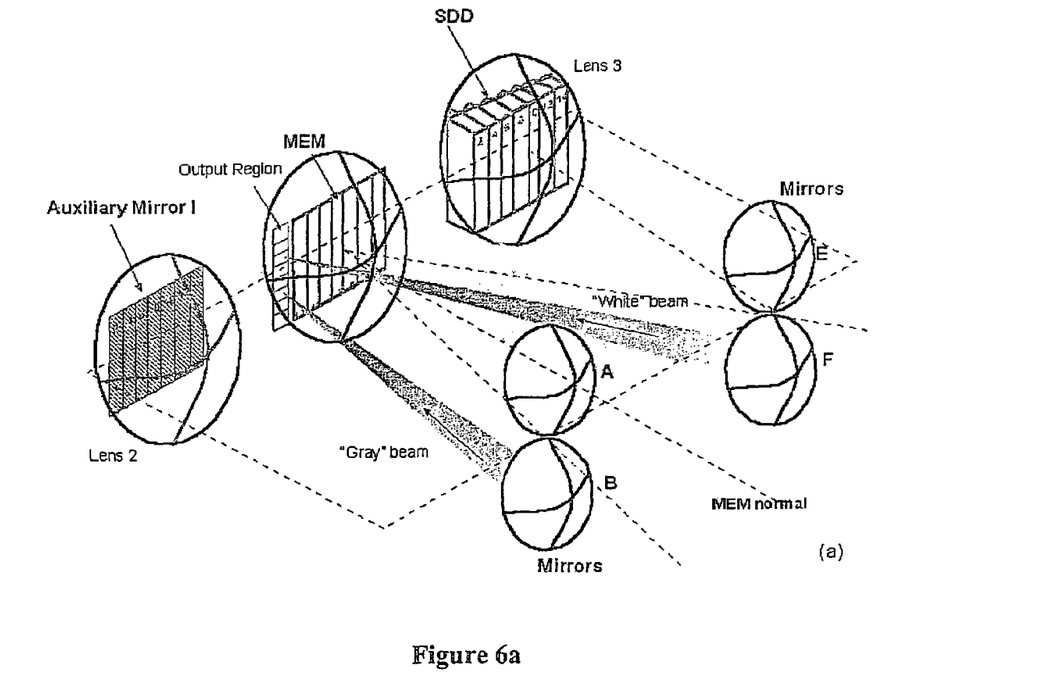
FIG. 6a illustrates the last bounce on the binary photonic switch where a "white" beam is coming from EF White Cell, and a "gray" beam is coming from AB white cell.

The lateral angle is the most severe. FIG. 6a shows the last bounce for two different beams (i.e. the "white" and "gray" beams of FIG. 5) for a 12-bounce system. The "white" beam is sent to the fifth output, meaning it was shifted on its last bounce, so it is coming from the EF White cell. On the other hand, the "gray" beam, directed to the second output, comes from the AB White cell on its last bounce. One simple way to solve this problem of difference in the lateral angle is to add one additional bounce. Then regardless of the output selected, all beams can be sent back to the AB White cell on their last bounce. The beams will come out at the appropriate row (i.e. output), and one column over, but now all beams will arrive at their respective output regions with the same incident lateral angle, FIG. 6b.

Figure 6B:
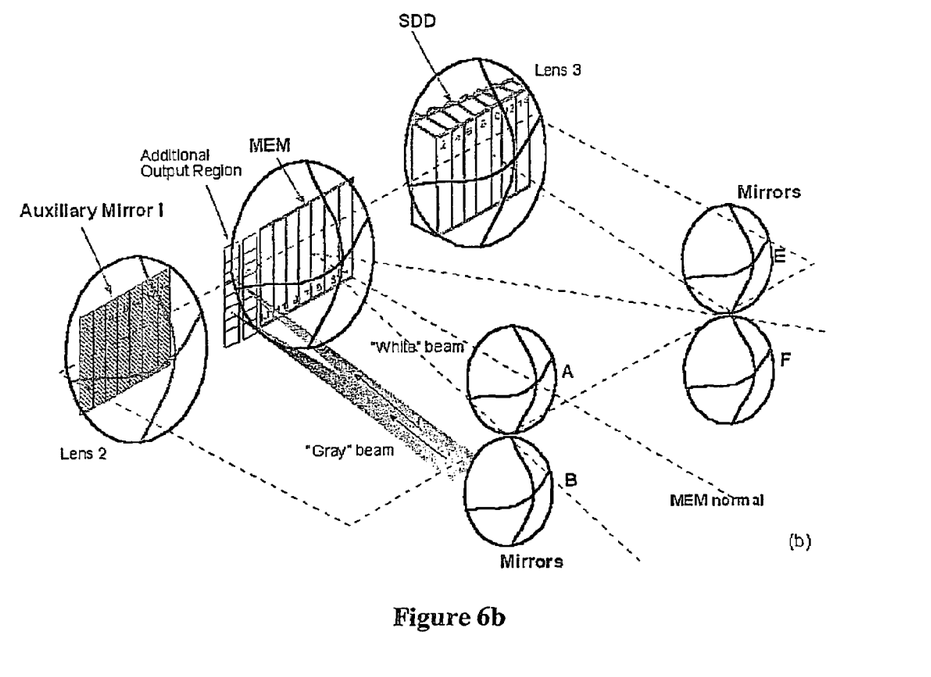
FIG. 6b illustrates the effect of an additional bounce causing both beams to come from the AB White cell.

The beams are all arriving from the same White cell now but are still directed to different outputs (FIG. 6b). Within each output region, each beam may arrive at any of several different locations (e.g. lower corner, middle). This creates a difference in the vertical angle at which a beam arrives.

Furthermore, the input spot array may be two-dimensional, having both columns and rows. Therefore all the rows and columns must be combined to a single spot, and this must be done taking into account the varying angles of incidence. The output should be a single spot, of the same size and shape as any individual input spot, and the output should emerge at a specific angle, independent of the arrival angle of any particular beam.

The present invention provides two solutions to the vertical angle problem. One uses a lens train and prisms, called "prism doorways," and the other uses holographic elements.

Prism Doorways

The first solution, called "prism doorways" uses a lens train and a set of prisms to accept incoming beams from different angles and deliver them all to the same point with the same incident angle. A lens train is formed by lenses of equal focal length separated by a distance d. The system will be stable (beams will not walk off the lenses) as long as the stability condition is fulfilled [6]:

$$0 \leq d \leq 4f \qquad (2)$$

Figure 7:
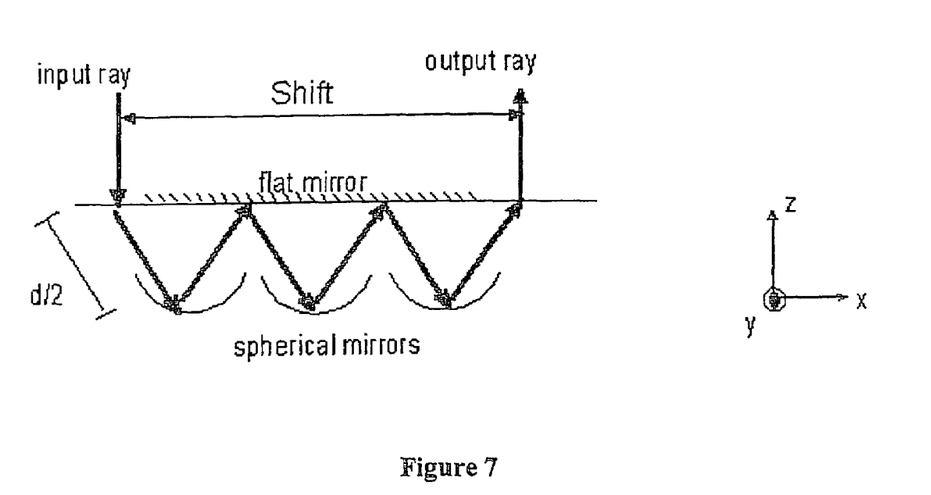
FIG. 7 is a diagram illustrating a two-plane optical lens train waveguide.

Spherical mirrors are used in place of the lenses, and the mirrors are placed all in the same plane, as shown in FIG. 7. A flat mirror is placed above. The propagation distance between the two planes, d/2, is chosen such that it doesn't exceed 2f, for stability. For the beam to travel in the x direction, the beam has to be incident in the spherical mirrors with a fixed angle θ.

Figure 8:
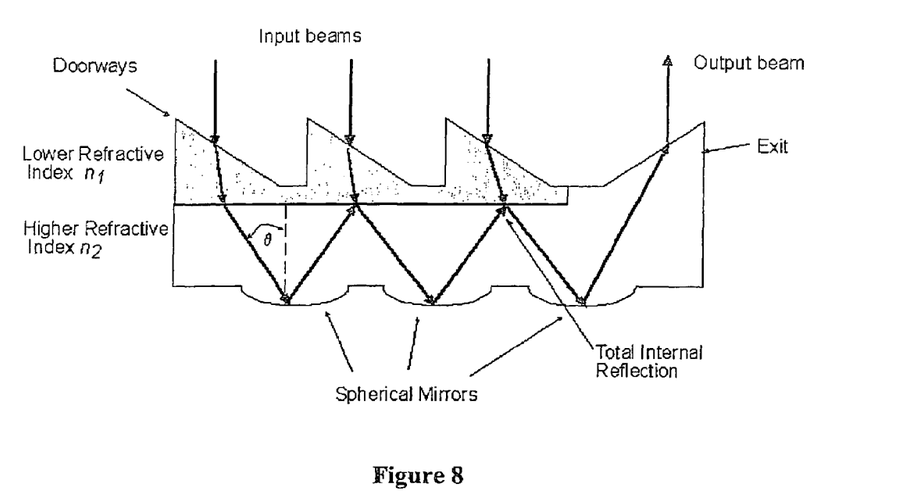
FIG. 8 is a diagram of a 3×1 beam combiner based on a prism shaped doorways/exit.

In FIG. 8 we can see the design for our first beam combiner. It is formed by several "doorways" that have prism shapes. The beam incident at each prism location arrives from a specific direction. Each prism is different from the next, and refracts the light to the spherical mirrors with the required angle θ.

The prism doorways are built with a material with refractive index $n_1$. The spherical mirrors are coated onto a different material of refractive index $n_2$, in such a way that $n_2 > n_1$. The angle θ is such that the beam will experience total internal reflection (TIR) at the boundary between both materials. As in FIG. 7 we have two planes, the first one consisting of a reflective surface (caused by the TIR in the boundary of the two materials), and the second being a series of spherical mirrors that refocus the light after each bounce.

The light progresses toward the exit, while being refocused by the spherical mirrors. An important part of this embodiment is that regardless of the doorway through which the beam comes into the beam combiner, all prism doorways direct the beam so that they travel through the same optical path. It is important to notice that each doorway prism will allow a beam to come in, but because of the TIR between materials, no light can escape through a doorway.

At the beam combiner's exit, we can see that there is no boundary between materials, so at this stage there is no TIR on the beam. The exit has another prism that couples the output beam into a fiber core or a detector.

The prism doorway solution just described will combine all the spots in a column to a single spot with a single output angle. A prism doorway array can be used in each column. Another prism doorway way be used in a second stage to combine all the columns (now one spot high) into a single row (single spot).

Substrate-Mode Holograms

Our second solution is based on substrate-mode holograms. Previously, holographic optical elements (HOE) for fan-out optical interconnects have been reported by using dichromated gelatin (DGH) integrated onto waveguide planes. In these, a single input spot is fanned out to an array of output spots using a series of HOEs. A beam propagates along a substrate by TIR, but at each bounce it encounters an HOE that diffracts some fraction of the light out into space. The efficiency of the HOEs is varied along the path such that each output beam has the same output power.

Figure 9A:
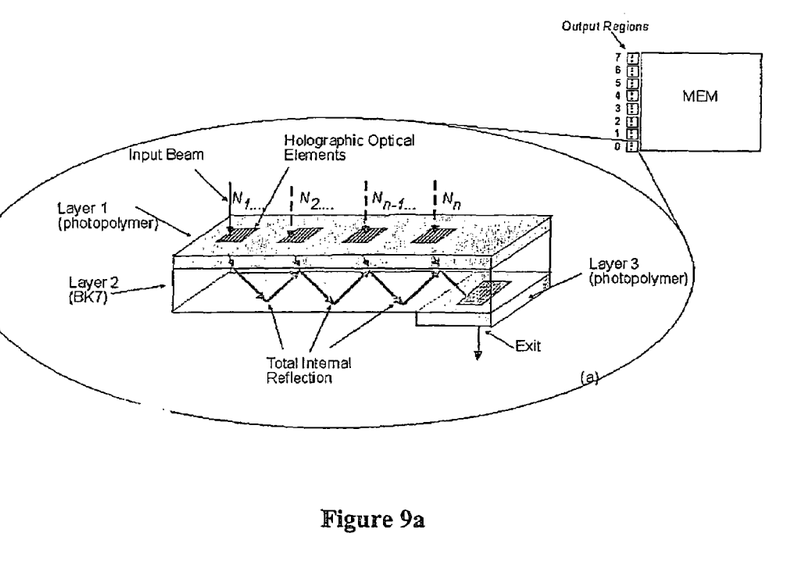
FIG. 9a is a diagram illustrating a substrate-hologram beam-combiner for a single column.

According to the present invention, substrate-mode holograms are used to produce an N×1 (fan-in) optical beam-combiner. The architecture of this new type of N×1 optical beam-combiner also consists of a double layer system. The first layer consists of a transmission type volume HOE array as shown in FIG. 9a. The second layer has a higher refractive index than the hologram substrate, and will function as a TIR waveguide medium. The first layer has N HOE elements.

Each HOE is designed to receive a single beam at a specific vertical angle. In our fan-in case, only one beam enters each HOE, so the efficiency is the same regardless of which position on the HOE the beam arrives at.

An input beam is incident on a HOE and it will be diffracted into the substrate. The diffraction angle is designed so that it is larger than the critical angle in the second layer; therefore the diffracted beam propagates in the second layer as a form of a guided wave, as in the first solution of the beam-combiner.

Figure 9B:
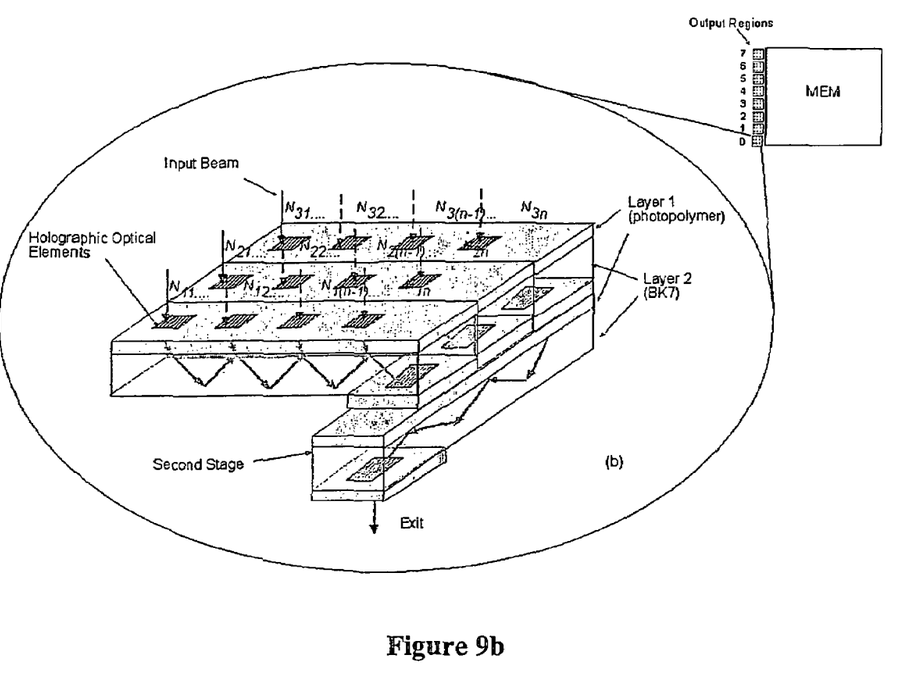
FIG. 9b is a diagram illustrating a substrate-hologram beam-combiner for multiple columns.

In the final stage another HOE is added below the second layer, as shown in FIG. 9b, so that the beam can be directed out of the substrate for subsequent coupling into a fiber core or detector.

The efficiency of the HOE will be a function of the substrate and exposure time used in its recording. The maximum efficiency that was routinely achieved experimentally was over 90% for an exposure time over 40 s, and intensity of the recording beams around 3.0 mW cm$^{-2}$, and using as substrate a DuPont photopolymer HRF 600×001-20, 20 μm thick.

The present application has disclosed beam combiners that combine a single column of input beams arriving from different angles, into a single output with a single angle, for example as shown in FIG. 9a. For a large switch, one may desire to arrange the input beams in a rectangular array of spots, as shown in FIG. 9b.

When the output regions have to accept beams arranged in more than one column, the exit stage may be modified, so that the device still have one single output. This can be easily solved by adding an additional beam combiner below the first. Each column functions exactly as before. The only difference is found in the final stage. There the outputs of every column are now the inputs for another beam combiner which eventually will direct all the beams to a single output where it can be coupled into a fiber or a detector.

Conclusion

A novel apparatus and method for combining beams from different spots and arriving at different angles to a single spot with a single fixed angle have been disclosed. The present invention includes two exemplary solutions, one based on prisms and a lens train, and the other based on substrate-mode holograms. Although binary optical interconnections were sued herein for the purposes of discussion, embodiments of the present invention operate equally well to all White cell-based optical interconnections. Further, the beam combiners of the present invention can serve anywhere where multiple beams arrive from in different places and from different angles.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and description in this disclosure are proffered to facilitate comprehension of the invention, and should not be construed to limit the scope thereof.

What is claimed is:

1. An optical combiner, including:
    a plurality of first refractive elements adapted to receive a corresponding plurality of optical input beams, each of the plurality of first refractive elements having a first refractive index; and
    a second refractive element disposed substantially parallel to the plurality of first refractive elements and adapted to receive a refracted input beam from each of the plurality of first refractive elements, the second refractive element having a second refractive index greater than the first refractive index and including a first internal reflective surface, wherein the first internal reflective surface is adapted to provide internal reflection of the refracted input beams toward an exit;
    wherein the plurality of first refractive elements and the second refractive element are configured to combine the plurality of optical input beams into an optical output beam at the exit.

2. The optical combiner set forth in claim 1 wherein each first refractive element includes a prism.

3. The optical combiner set forth in claim 2 wherein each prism forms a prism doorway.

4. The optical combiner set forth in claim 1, wherein the first internal reflective surface is disposed on a first side of the second refractive element facing the plurality of first refractive elements, the second refractive element further including:
    a plurality of mirrors disposed along a plane substantially parallel to the plurality of first refractive elements on a second side of the second refractive element opposite the first side and oriented to provide internal reflection, wherein each mirror of the plurality of mirrors is associated with a corresponding first refractive element of the plurality of first refractive elements, and
    a layer of refractive material between the first internal reflective surface and the plurality of mirrors.

5. The optical combiner set forth in claim 4 wherein each of the plurality of mirrors is a spherical mirror.

6. The optical combiner set forth in claim 1, each first refractive element including:
    a grating portion; and
    a refractive substrate layer.

7. The optical combiner set forth in claim 6 wherein the grating portion includes a holographic optical element.

8. The optical combiner set forth in claim 1 wherein the first internal reflective surface is disposed in relation to a first side of the second refractive element and adjacent to the plurality of first refractive elements, the second refractive element including:
    a second internal reflective surface disposed in relation to a second side of the second refractive element opposite the first side, and
    a layer of refractive material between the first internal reflective surface and the second internal reflective surface.

9. The optical combiner set forth in claim 1, further including:
    a third refractive element disposed between the second refractive element and the exit to direct the optical output beam from the optical combiner.

10. The optical combiner set forth in claim 9, the third refractive element including:
    a grating adapted to receive the optical output signal from the second refractive element; and
    a substrate layer adapted to direct the optical output beam toward the exit.

11. The optical combiner set forth in claim 10 wherein the grating includes a holographic optical element.

12. An optical combiner, including:
    a plurality of prisms configured to receive a corresponding plurality of optical input beams, each of the plurality of prisms having a common refractive index;
    a plurality of mirrors disposed substantially parallel to the plurality of prisms, each mirror associated with one of the plurality of prisms; and a boundary layer disposed between the plurality of prisms and the plurality of mirrors, the boundary layer having a refractive index greater than the common refractive index of the plurality of prisms;

wherein the common refractive index and the boundary layer refractive index are configured to combine the plurality of optical input beams into an optical output beam.

13. The optical combiner set forth in claim 12 wherein each prism forms a prism doorway.

14. The optical combiner set forth in claim 12 wherein each of the plurality of mirrors includes a spherical mirror.

15. The optical combiner set forth in claim 12 wherein the common refractive index and the boundary layer refractive index are configured to change the angle of each of the plurality of optical input beams.

16. An optical combiner, including:
a first layer having a first refractive index and adapted to receive a plurality of optical input beams; and
a second layer disposed substantially parallel to the first layer and adapted to receive a plurality of refracted input beams from the first layer, each refracted input beam being associated with a corresponding optical input beam of the plurality of optical input beams, the second layer having a second refractive index greater than the first refractive index and including a first internal reflective surface adapted to provide internal reflection of the refracted input beams toward an exit;
wherein the first layer and second layer are configured to combine the plurality of optical input beams into an optical output beam at the exit.

17. The optical combiner set forth in claim 16 wherein the first layer includes a plurality of paired lens trains and prisms corresponding to the plurality of optical input beams, each lens train and prism pair configured to receive a corresponding optical input beam.

18. The optical combiner set forth in claim 17, the second layer including:
a plurality of mirrors disposed substantially parallel to the plurality of lens train and prism pairs, each mirror associated with one of the plurality of lens train and prism pairs; and
a boundary layer disposed between the plurality of lens train and prism pairs and the plurality of mirrors.

19. The optical combiner set forth in claim 16, the first layer including:
a plurality of holographic optical elements corresponding to the plurality of optical input beams, each holographic optical element configured to receive a corresponding optical input beam; and
a substrate layer.

20. The optical combiner set forth in claim 19 wherein the first internal reflective surface is on a first side of the second layer facing the first layer, the second layer including:
a second internal reflective surface on a second side of the second layer opposite the first side, and
a layer of refractive material between the first internal reflective surface and the second internal reflective surface.

21. The optical combiner set forth in claim 20, further including:
a third layer disposed between the second layer and the exit to direct the optical output beam from the optical combiner.

22. The optical combiner set forth in claim 21, the third layer including:
a holographic optical element adapted to receive the optical output signal from the second layer; and
a substrate layer adapted to direct the optical output beam toward the exit.

* * * * *